(12) United States Patent
Abdallah

(10) Patent No.: US 10,908,913 B2
(45) Date of Patent: *Feb. 2, 2021

(54) METHOD FOR A DELAYED BRANCH IMPLEMENTATION BY USING A FRONT END TRACK TABLE

(71) Applicant: Intel Corporation, Santa Clara, CA (US)

(72) Inventor: Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,329

(22) Filed: Aug. 9, 2019

(65) Prior Publication Data

US 2019/0361704 A1 Nov. 28, 2019

Related U.S. Application Data

(63) Continuation of application No. 15/783,923, filed on Oct. 13, 2017, now Pat. No. 10,417,000, which is a
(Continued)

(51) Int. Cl.
*G06F 9/32* (2018.01)
*G06F 9/305* (2018.01)
(Continued)

(52) U.S. Cl.
CPC ........ *G06F 9/3806* (2013.01); *G06F 9/30094* (2013.01); *G06F 9/3842* (2013.01);
(Continued)

(58) Field of Classification Search
CPC .. G06F 9/3806; G06F 9/30094; G06F 9/3842; G06F 9/3844; G06F 9/30058;
(Continued)

(56) References Cited

U.S. PATENT DOCUMENTS 4,777,587 A 10/1988 Case et al.
5,165,025 A * 11/1992 Lass ...................... G06F 9/3804
712/235

(Continued)

FOREIGN PATENT DOCUMENTS

EP 0375249 A2 6/1990
EP 0935200 A1 8/1999
(Continued)

OTHER PUBLICATIONS

Barreiros, et al., "QOS-Enabled Networks: Tools and Foundations," Jan. 1, 2016, pp. 125-126.
(Continued)

*Primary Examiner* — Daniel H Pan
(74) *Attorney, Agent, or Firm* — NDWE LLP

(57) ABSTRACT

A method for a delayed branch implementation by using a front end track table. The method includes receiving an incoming instruction sequence using a global front end, wherein the instruction sequence includes at least one branch, creating a delayed branch in response to receiving the one branch, and using a front end track table to track both the delayed branch the one branch.

20 Claims, 7 Drawing Sheets

Related U.S. Application Data continuation of application No. 14/216,683, filed on Mar. 17, 2014, now Pat. No. 9,817,666.

(60) Provisional application No. 61/852,057, filed on Mar. 15, 2013.

(51) Int. Cl.
*G06F 9/38* (2018.01)
*G06F 9/30* (2018.01)

(52) U.S. Cl.
CPC ........ *G06F 9/3844* (2013.01); *G06F 9/30021* (2013.01); *G06F 9/30058* (2013.01); *G06F 9/321* (2013.01); *G06F 9/3861* (2013.01)

(58) Field of Classification Search
CPC ...... G06F 9/321; G06F 9/3846; G06F 9/3848; G06F 9/30072; G06F 9/3861; G06F 9/30021
USPC .................................................. 712/237–240
See application file for complete search history.

(56) References Cited

U.S. PATENT DOCUMENTS

| | | | |
|---|---|---|---|
| 5,179,689 A | 1/1993 | Leach et al. | |
| 5,303,362 A | 4/1994 | Butts, Jr. et al. | |
| 5,459,845 A * | 10/1995 | Nguyen .................. | G06F 9/322 712/248 |
| 5,561,775 A | 10/1996 | Kurosawa et al. | |
| 5,809,294 A * | 9/1998 | Ando .................. | G06F 9/30072 712/233 |
| 5,937,202 A | 8/1999 | Crosetto | |
| 6,088,793 A | 7/2000 | Liu et al. | |
| 6,266,764 B1 * | 7/2001 | Okamoto .............. | G06F 9/3851 712/205 |
| 6,338,108 B1 | 1/2002 | Motomura | |
| 6,782,405 B1 | 8/2004 | Matula et al. | |
| 6,980,543 B1 | 12/2005 | Kastenholz et al. | |
| 7,200,865 B1 | 4/2007 | Roscoe et al. | |
| 7,521,961 B1 | 4/2009 | Anderson | |
| 7,688,815 B2 | 3/2010 | Bialkowski et al. | |
| 7,782,873 B2 | 8/2010 | Sharma et al. | |
| 9,817,666 B2 | 11/2017 | Abdallah et al. | |
| 10,417,000 B2 * | 9/2019 | Abdallah .............. | G06F 9/3844 |
| 2002/0174321 A1 | 11/2002 | John et al. | |
| 2004/0190503 A1 | 9/2004 | Bansal et al. | |
| 2004/0202178 A1 | 10/2004 | Okubo | |
| 2004/0213291 A1 | 10/2004 | Beshai et al. | |
| 2006/0013207 A1 | 1/2006 | McMillen et al. | |
| 2006/0168400 A1 | 7/2006 | Ronciak et al. | |
| 2008/0151863 A1 | 6/2008 | Lawrence et al. | |
| 2011/0047354 A1 | 2/2011 | Hobson et al. | |
| 2011/0314444 A1 | 12/2011 | Zhang et al. | |
| 2014/0185611 A1 | 7/2014 | Lie et al. | |
| 2014/0269753 A1 | 9/2014 | Abdallah | |
| 2014/0324937 A1 | 10/2014 | Abdallah | |

FOREIGN PATENT DOCUMENTS

| | | |
|---|---|---|
| EP | 2738683 A1 | 6/2014 |
| TW | I321016 B | 2/2010 |

OTHER PUBLICATIONS

Batcher K.E., "Sorting Networks and their Applications," Spring Joint Computer Conference, Apr. 1968, pp. 307-314.

Brandner, et al., "Static Routing in Symmetric Real-Time Network-on-Chips," Informatics and Mathematical Modeling Technical University of Denmark, 2012, pp. 61-70.

Final Office Action from U.S. Appl. No. 15/783,923, dated Mar. 11, 2019, 16 pages.

Final Office Action from U.S. Appl. No. 14/216,683, dated Aug. 29, 2016, 18 pages.

Hendry, et al., "Time-Division-Multiplexed Arbitration in Silicon Nanophotonic Networks-On-Chip for High-Performance Chip Multiprocessors," Journal of Parallel and Distributed Computing, vol. 71 (5), Sep. 2010, pp. 641-650.

Hussain S.A., "Active and Programmable Networks for Adaptive Architectures and Services," Dec. 15, 2006, pp. 199-226.

Non-final Office Action from U.S. Appl. No. 14/216,683, dated Apr. 1, 2016, 14 pages.

Non-Final Office Action from U.S. Appl. No. 14/216,683, dated Mar. 15, 2017, 24 pages.

Non-Final Office Action from U.S. Appl. No. 15/783,923, dated Sep. 12, 2018, 21 pages.

Notice of Allowance from U.S. Appl. No. 14/216,683, dated Jul. 24, 2017, 7 pages.

Notice of Allowance from U.S. Appl. No. 15/783,923, dated May 20, 2019, 8 pages.

* cited by examiner

Table 1. Delayed Branch Table Fields.

| Entry | Description | Width |
|---|---|---|
| hint_tid | Thread ID of the Hint Inst | 1b |
| hint_bnum | Bnum of the Allocated Hint Inst | 8b |
| hint_dir | Direction was Hinted | 1b |
| hint_tar | Target was Hinted | 1b |
| hint_valid | Hint has been inserted | 1b |
| hint_reg | Hint Register (Source for Branch) | 7b |
| branch_bnum | Bnum of the Branch Inst | 8b |
| flags | Flags for the Condition Generation | 5b |
| cond | Condition code of the Branch | 5b |
| pred | Dynamic prediction for the Branch Inst | 1b |
| target | Indirect Target | 32b |

Fig. 1

# METHOD FOR A DELAYED BRANCH IMPLEMENTATION BY USING A FRONT END TRACK TABLE

CROSS-REFERENCE TO RELATED APPLICATIONS

This application is a continuation of U.S. application Ser. No. 15/783,923, filed Oct. 13, 2017, which application is a continuation of U.S. application Ser. No. 14/216,683, filed Mar. 17, 2014, now U.S. Pat. No. 9,817,666, which application claims the benefit commonly assigned U.S. Provisional Patent Application Ser. No. 61/852,057, titled "A METHOD FOR A DELAYED BRANCH IMPLEMENTATION BY USING A FRONT END TRACK TABLE" by Mohammad A. Abdallah, filed on Mar. 15, 2013, all of which are incorporated herein in their entirety.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using state of the art compiler or user parallelization techniques for non-explicitly/easily parallelized/threaded software codes.

SUMMARY OF THE INVENTION

In one embodiment, the present invention is implemented as a method for a delayed branch implementation by using a front end track table. The method includes receiving an incoming instruction sequence using a global front end, wherein the instruction sequence includes at least one branch, creating a delayed branch in response to receiving the one branch, and using a front end track table to track both the delayed branch the one branch.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 1 shows a table of exemplary delayed branch table fields in accordance with one embodiment of the present invention.

DETAILED DESCRIPTION OF THE INVENTION

Figure 2:
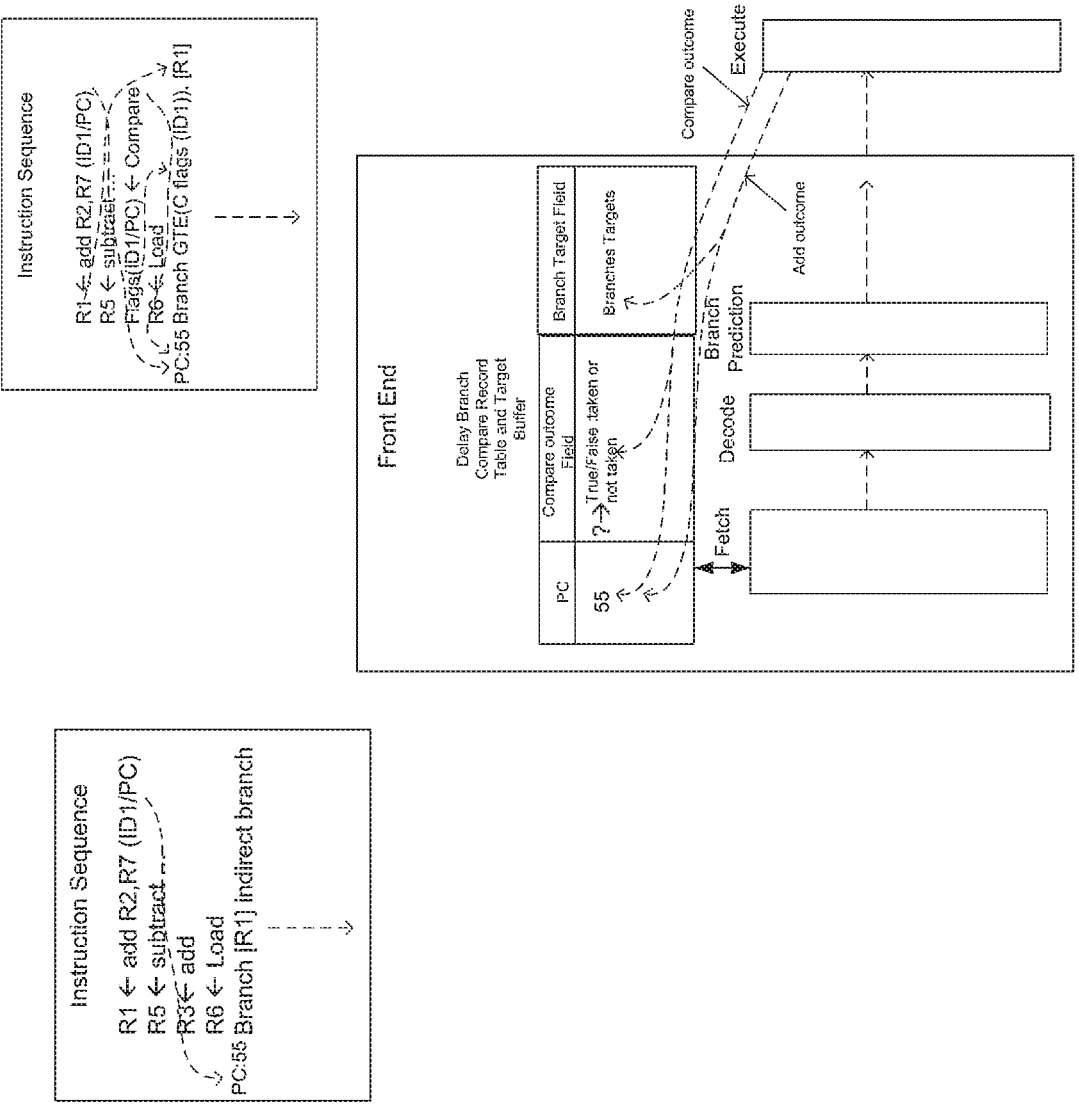
FIG. 2 shows a diagram illustrating the link in the front end between a delayed branch compare record table and target buffer (DBCRT) and a fetch stage of a processor in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

In one embodiment, the present invention is implemented as a delayed branch implementation using a front end table to track the delayed branch and the branch instruction itself. In an advanced high performance microprocessor core there is a very wide fetch and issue machine as well as several pipeline stages to execute a general instruction or a branch instruction. There is good amount of speculation and the cost of a branch miss-predict is heavy. For this reason the hardware is being designed to enable optimizations to the branch prediction logic with the aid of software.

In one embodiment optimizers are used. One of these measures is a delayed or hinted branch. The optimization starts by the software trying to schedule the producers of the condition source or indirect target of a branch as far from the consumer branch as possible. At the same time, the producer is tagged to have had created the source for a pending branch.

The hardware (e.g., front end) recognizes the instruction that acts as the producer and attempts to store the source/target in the frontend itself (e.g., after the instruction is executed). When the actual branch arrives, the front end pairs that branch with its condition source, and calculate the accurate prediction or used the target as the redirection target for the instruction fetch. This allows for very high prediction rates provided the branch can be successfully paired with the hint.

The inclusion of a distributed flag architecture, such that where each architecture or physical register has a flag field as part of the visible state. This allows for a simple predication mechanism for conditional execution of an instruction and the ability to easily create delay slots for branch instructions. For example, in a loop, the test instruction that tests the loop end condition has to be preceding the branch instruction with no other flag modifying instructions in between. Using the distributed flag architecture, and by specifying that this branch depends on the flag of a particular register (e.g., the destination of the test instruction in this example), the test condition could be placed at the beginning of the loop while the actual branch can be at the end of the loop. Therefore, by the time the branch instruction is at the front end of the machine, the test instruction has already been executed and the branch can execute at the front end stage rather than at the execution stage, thus removing bubbles.

Those register flags also facilitate simple instruction predication or thread predication, where instructions or instructions in a particular thread can be predicated based upon the result of a particular instruction that does not need to be preceding it immediately in the execution sequence. The test instruction can typically be executed ahead of where the branch is. Based on its result, it will fetch the right path of the program instructions and keep them aside until the branch instruction is allocated at the front end and then it feeds those instructions in the pipeline. It is possible also for this architecture to predicate the instructions after the branch and execute them before the branch and uses a conditional move after executing the branch. It is also possible to issue 2 threads alongside the 2 possible control paths of execution.

Moreover, the test instruction can execute speculatively even if its sources are speculative or predicted by the hardware or the compiler, but it writes into a speculative flag, when the actual test instruction that precedes the branch executes, it writes into the flag, at that point the 2 flags are compared and if they match the speculative thread of execution that started with the test instruction, then that thread continues as being on the correct control path, while the other thread stops fetching instructions using the inheritance merging mechanism. In the case the flags do not match, then the other thread continues fetching and the thread of the early test stops. This allows for thread speculation and fast recovery from miss speculation (no latency penalty for early speculation of branches). It should be noted that the implementation can use a test instruction that have an indicator referencing a particular branch, or alternatively a delayed branch instruction that clones the actual branch can be used.

The following describes a high level overview of one embodiment of the present invention. In one embodiment, branch prediction is not very accurate and the penalty of each branch miss prediction is high.

In one embodiment, a clone of the branch instruction "delayed branch instruction" (or alternatively a delayed branch indicator assigned to the test instructions that sets the flag condition for that branch) is used. Basically it tests the same condition that the branch uses but does not cause the path change at the position of that instruction.

In one embodiment, it refers to a different position (e.g., program counter PC) where the actual path change should occur (e.g., can reference that suing offset form its current PC). Upon execution of this delayed branch instruction; it checks if the actual branch it refers has already passed the front end, if it did not yet, then delayed branch table entry for that branch will be updated with the outcome of the delayed branch execution, this overrides branch prediction.

In one embodiment, depending on the way that branch has been predicted versus the outcome of the delayed branch instruction itself, the branch will be flushed if it was predicted different than the delayed branch, otherwise no action needed.

In one embodiment, a table is constructed at the front end of the machine to track the delayed branch instruction/indicator and to record the PC offset to the actual branch instruction it refers. If the branch instruction passes the front end it compares its PC to all the delayed branch records in this table, if it matches its PC with any PC referred to by the delayed branch records (e.g., using PC offset) it will update the record with the branch instruction internal machine physical tracking information (e.g., such as the internal renamed physical register).

This physical tracking information in needed so that when the delayed branch executes it can flush the actual branch and all instructions after it. The delayed branch is very useful if the delayed branch instruction/indicator can be hoisted much earlier in the instruction stream ahead of the branch itself using distributed flag architecture.

FIG. 1 shows a table of exemplary delayed branch table fields in accordance with one embodiment of the present invention. The first part of the implementation resides in the frontend of the machine in the form of a table which holds the hints and pairs the branches. The following are the fields in the Delayed Branch Table (DBT). There are two sets of actions that need to be carried out. The first when the hint (prefix) is encountered and the second when the associated branch is encountered.

Hint Instruction Processing in accordance with one embodiment of the present invention is now described. When an instruction with a predicated Prefix is decoded (an instruction that can influence a branch outcome or target) in the frontend, the prefix provides the hint indicating (PRED.DIR) that the resulting flags will be used to predict the direction of a branch or (PRED.IND) the result of Instruction will be used as the target for the subsequent indirect branch. The following actions are taken from this point on. In one embodiment, the information in the prefix is used to populate the DBT with hit_dir, hint_tar, hit_reg and hit_tid. This can be carried out in the F0 stage with the update performed in F1. When the FE encounters an instruction with this prefix, it sets a bit to indicate the presence of this prefix in the instruction.

In one embodiment, at the time SCH allocates this instruction, it sends the allocated Bnum (physical tag) back to the frontend and its written to the head where the prefix was decoded into. The pointer in the DBT is incremented to the next empty slot. The Interface to the DBT from SCH therefore needs Bnum[8b] and Valid[1b].

In one embodiment, when the hint is executed it generates the data needed by the branch instruction and this data needs to be populated in the DBT. This data comprises either the Flags for the condition or the target itself. In one embodiment, the interface with the EXE is the following: HintValid [1b], HintBnum[8b], HintFlags[5b], HintTarget[32b]. If at the time of the update of the DBT with this data the Branch has already looked up the DBT, the branch would have inserted the dynamic prediction it has looked up or the target that was predicted for the branch. In this case the condition is recalculated with the correct flags or the target is compared with the predicted target and if either of the case mis-matches the prediction the branch went to the SCH with, a miss-predict is raised and the FE is redirected by the scheduler (e.g., through the normal path).

This miss-predict is raised after the branch is corrected in the SCH. Comparison logic in the dispatch/RF and EXE stages, and update ports in the speculative renaming tables are used to update the prediction/target of the branch block. This update is necessary for functional correctness.

One embodiment of branch instruction processing is now described. When the Branch instruction arrives, most of the setup is already done by the hint in the case that a hint was available. The Branch is decoded for its Condition Source Register/Indirect Target Source Register and this is "CAM'ed" against the hint_reg in the DBT. If a match is found (e.g., valid match) for the same thread, either the condition is calculated and used as the dynamic prediction result for the branch or the in directed target is used as the result of the BTB. If a match is found but the hint instruction has not updated the field with the values results from the regular FE predictors are inserted into the DBT to compare against the values the hint will eventually update. The only other action the branch takes is to update the branch_bnum when the branch gets allocated in the scheduler.

The delayed branch table management is now described. In one embodiment, the DBT can be implemented as a 16 Entry structure. It is looked up using the 4 most significant bits of the register source (e.g., condition/target) of the branch instruction. When looked up by a hint, the entry is always over written as part of the maintenance. When looked up by the branch instruction, the branch must CAM the source register to confirm the correct hint association. Once a branch is associated with a hint the hint is invalidated.

FIG. 2 shows a diagram illustrating the link in the front end between a delayed branch compare record table and target buffer (DBCRT) and a fetch stage of a processor in accordance with one embodiment of the present invention. In this embodiment, the program counter (PC) value is used to implement the link between the add and its corresponding branch by storing the outcome of the add destination register such that it is indexed by the PC of the corresponding branch. In this case, when the branch is fetched, its PC is checked against the table to determine if the destination register of the corresponding add is known from its execution.

In one embodiment, a benefit of having a table approach as shown here is that the table can record the indirect target of the branch obtained from the destination register of the add and index it by the PC of the corresponding branch such that it can intercept that branch at the fetch stage using the PC index. In such a case, the branch will check its PC against the PC's recorded in the table and utilize the information regarding the branch target obtained from the corresponding add destination register to decide on the target of the control path of the branch.

In one embodiment, this mechanism requires the table to also store the destination register value. In addition, if the indirect branch is conditional, the outcome of the compare that generates the flag needed for the conditional part of the indirect conditional branch will be also recorded. In this case, a combination of the compare instruction fields and the add destination fields, each having a different link, can be used together. For example, this case can be implemented such that both the compare and the add both link to the PC of the indirect conditional branch.

In one embodiment, when the branch arrives at the fetch stage, it will look up the DBCRTTB and if both the compare and the add have updated the branch corresponding entry, the branch will resolve both its conditional outcome (taken or not taken) and the indirect target of the branch. Appropriate update/valid bits need to be stored with the different fields of the table.

Figure 3:
FIG. 3 shows a diagram of an instruction sequence or a branch test condition that decides to change control simultaneously in accordance with one embodiment of the present invention.

FIG. 3 shows a diagram of an instruction sequence or a branch test condition that decides to change control simultaneously in accordance with one embodiment of the present invention. In traditional architectures, a branch instruction tests a condition and decides to change control simultaneously by the same branch instruction when the branch instruction executes. The compare instruction sets the flags that the branch will test and choose its control path accordingly.

Figure 4:
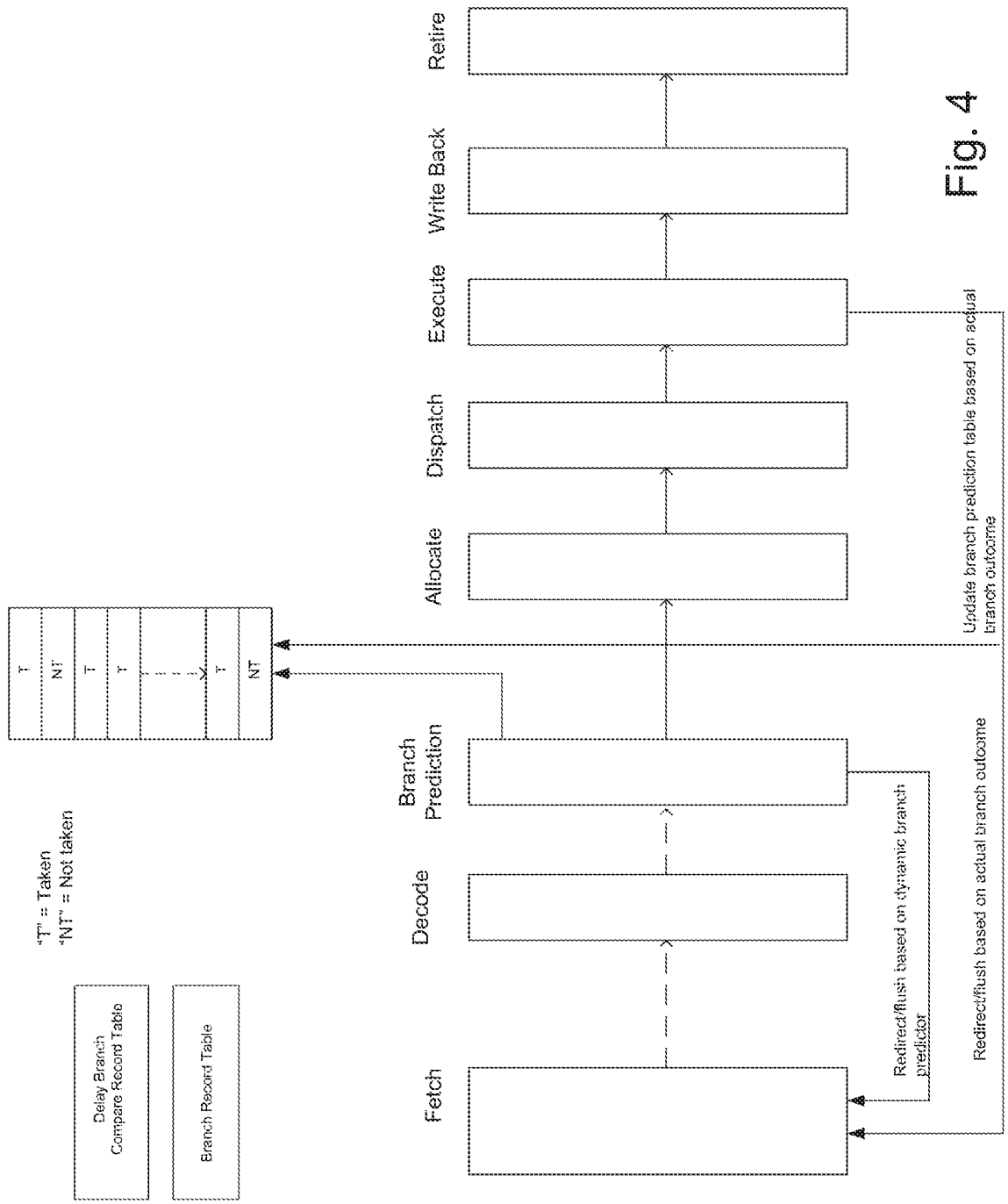
FIG. 4 shows a diagram showing the fetch stage and other stages of the pipeline through to the retirement stage in accordance with one embodiment of the present invention.

FIG. 4 shows a diagram showing the fetch stage and other stages of the pipeline through to the retirement stage in accordance with one embodiment of the present invention. In one embodiment, a run time optimizer (e.g., just-in-time (JIT) or hardware based) can optimize the compare and its corresponding branch by reordering the instructions so that there is more separation (e.g., instruction wise) between the compare and its corresponding branch to allow enough time for the results of the compare to be available before the branch reaches the fetch and branch prediction stages.

As shown by the FIG. 4 embodiment, the objective is to create a link that connects the results of the execution of a compare to its corresponding branch in a way to steer the branch prediction in the manner of a hint. In one embodiment, the hint is used to update the branch prediction table. This is referred to as a "pure hint". If the compare is far enough ahead of the corresponding branch, the execution results of the compare can be used to steer the branch in the correct direction, thereby avoiding a miss-prediction and a flush of the pipeline. The key is whether there is enough space, instruction wise such that enough time exists, between when the compare executes updating the branch prediction table with the hint and the time that the corresponding branch reaches the branch prediction stage. If there is sufficient space, the hint will make the branch prediction 100% correct. This hint will overwrite whatever prediction bits that are already in the branch prediction table. Traditionally, branch prediction depends on the history of the branch's execution (e.g., taken or not taken). The hint of this embodiment overwrites any history of the branch, thereby ensuring the correct result.

Figure 5:
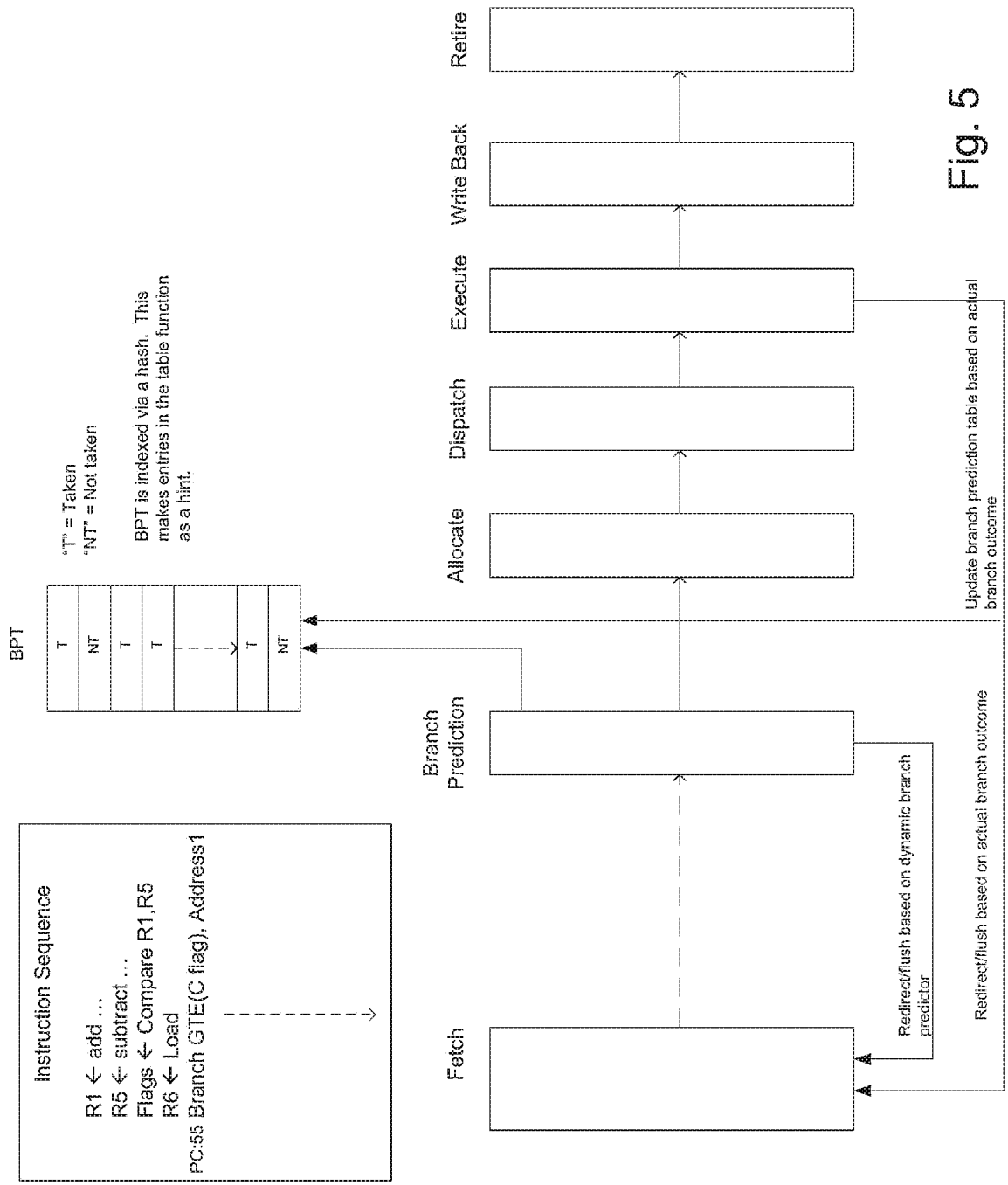
FIG. 5 shows diagram showing the fetch stage and other stages of the pipeline through to the retirement stage in accordance with one embodiment of the present invention.

FIG. 5 shows diagram showing the fetch stage and other stages of the pipeline through to the retirement stage in accordance with one embodiment of the present invention. FIG. 5 shows the particular table entries of the branch prediction table (BPT). In another embodiment, as described above, if the branch has passed the branch prediction stage, the information linking the branch to the compare is used to flush any incorrectly predicted branch and any subsequent instructions from the pipeline. If the branch has not passed the branch prediction stage, the information linking the branch to the compare (e.g., the hint described above) is used to overwrite the branch prediction table and thereby steer the branch to the correct taken or not taken path.

Figure 6:
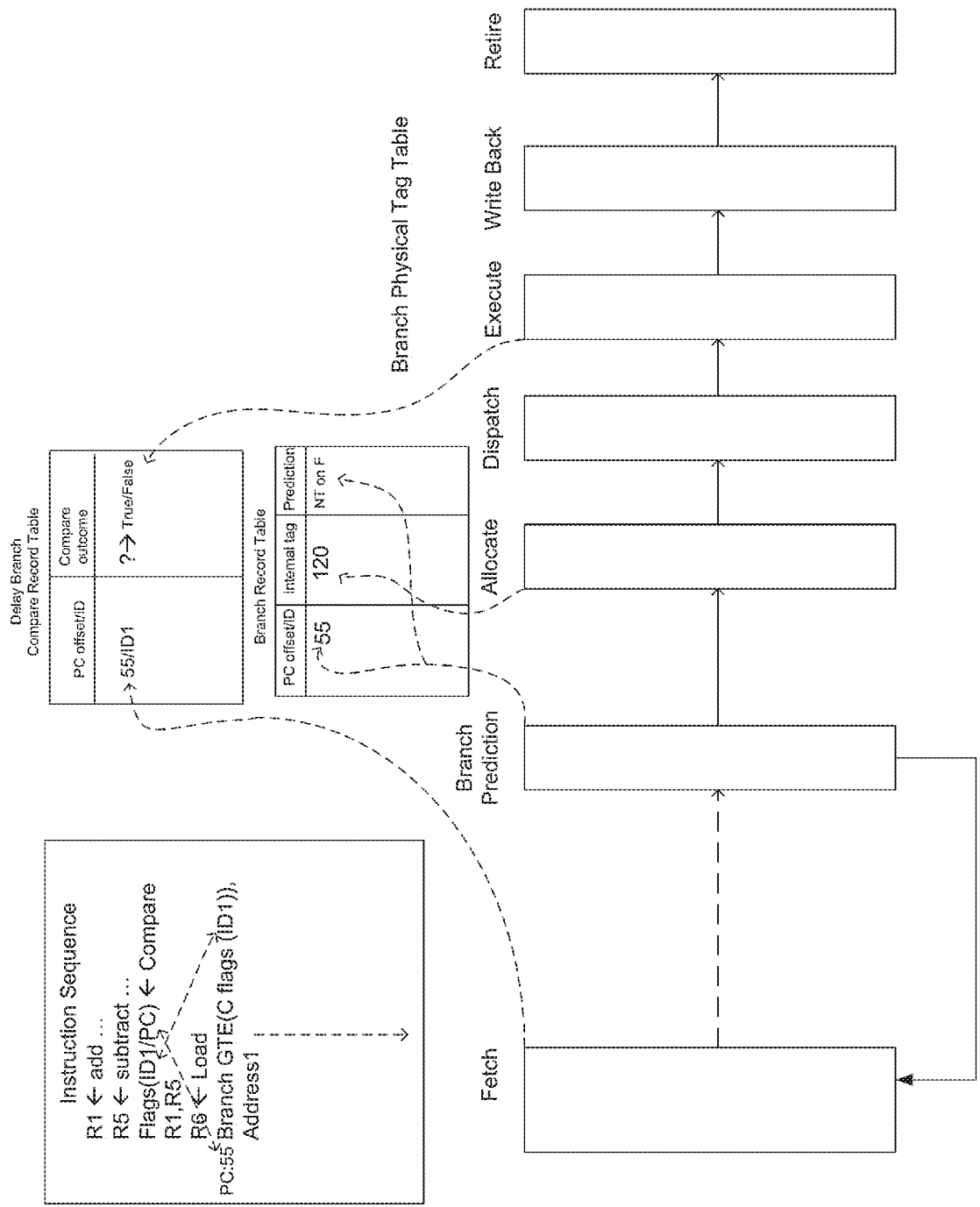
FIG. 6 diagrams the manner in which a compare instruction is linked with a corresponding branch in accordance with one embodiment of the present invention.

FIG. 6 diagrams the manner in which a compare instruction is linked with a corresponding branch in accordance with one embodiment of the present invention. The compare is linked with its corresponding branch in one of two ways. In a first way, the compare is linked via an ID that is shared with the branch and it acts as a version ID of the flags that this particular compare instruction is updating, regardless of any other updates to the flags. In a second way, the branch is linked with the compare using the offset in the PC between the compare and the branch such that the offset is embedded in the compare instruction syntax/format.

In one embodiment, when the compare instruction is allocated, it records the branch PC/ID using the link information in the DBCRT. When the compare instruction reaches execution, it will update the compare outcome field with the result of the compare execution. On the other hand, when the branch is fetched, it checks the DBCRT for a corresponding compare instruction record, and if the compare outcome is available it will ignore the branch prediction table and use the result of the compare outcome from the DBCRT. If however, the compare outcome is not available at the time of branch fetch, then the branch continues through the next stages and uses the branch prediction value and at the same time, records that value in the BRT. Later on, when the compare outcome is known from execution, it will reference the BRT and if it finds a record of a corresponding branch, it will compare the branch prediction verses the compare actual outcome, and if they differ, then a branch flush will be triggered using the machine internal tag, thereby flushing all instructions after the branch.

In one embodiment, a benefit of having a table approach as shown here is that the table can record the outcome of the compare and index it by the PC of the corresponding branch such that it can intercept that branch at the fetch stage using the PC index. In such a case, the branch will check its PC against the PC's recorded in the table and utilize the information regarding the outcome of the corresponding compare to decide on the direction of the control path of the branch.

Figure 7:
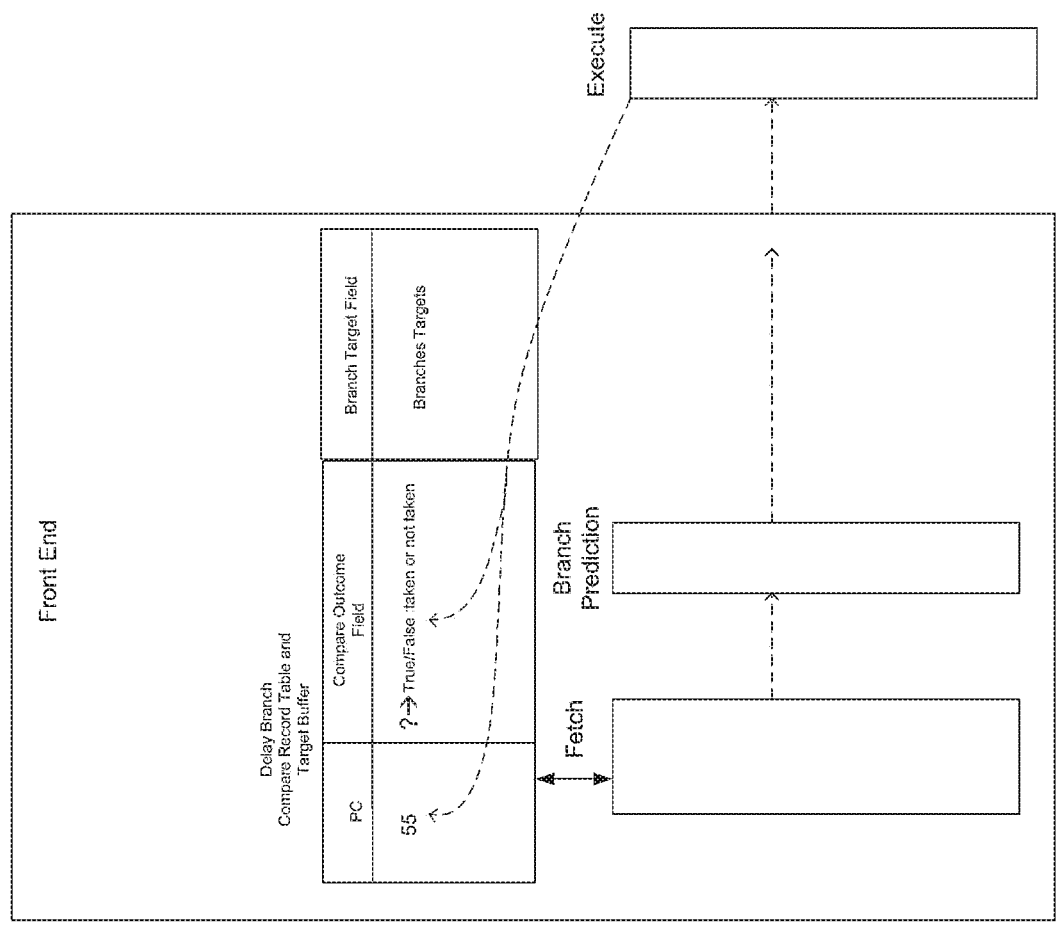
FIG. 7 shows a diagram illustrating the link in the front end between the DBCRT and the fetch stage in accordance with one embodiment of the present invention.

FIG. 7 shows a diagram illustrating the link in the front end between the DBCRT and the fetch stage in accordance with one embodiment of the present invention. This figure shows the link in the front end between the DBCRT and the fetch stage. In this embodiment, the PC value is used to implement the link between the compare and its corresponding branch by storing the outcome of the compare such that it is indexed by the PC of the corresponding branch. In this case, when the branch is fetched, its PC is checked against the table to determine if the outcome of the corresponding compare is known from its execution.

In one embodiment, a benefit of having a table approach as shown here is that the table can record the outcome of the compare and index it by the PC of the corresponding branch such that it can intercept that branch at the fetch stage using the PC index. In such a case, the branch will check its PC against the PC's recorded in the table and utilize the information regarding the outcome of the corresponding compare to decide on the direction of the control path of the branch.

In one embodiment, this mechanism requires the table to also store the relation between the outcome of the compare (whether it is false or true) with the direction of the branch being taken or not taken. In addition, to avoid the need to decode the direct branch to figure out the target of the branch, the table will also store the target of the branch (in the DBCRTTB). The run time optimizer can embed in the compare instruction the target of the branch. The benefit of having the target of the direct conditional branch stored in the DBCRTTB is that it allows the fetch unit to immediately change the control path appropriately based on the branch being taken or not taken as updated by the outcome of the compare stored in the DBCRTTB.

In one embodiment, if the branch however is an indirect branch (e.g., the branch does not have an explicit target value, but an indirect reference value, such as the target being referenced by a register), then another field in the table can provide the predicted target for the branch, as opposed to obtaining it from the compare instruction, as illustrated in FIG. 6. The fetch, when it finds a taken branch in the DBCRTTB, will redirect the fetching of instructions from the obtained branch target.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for determining outcomes of branch instructions by using a delayed branch compare record table, the method comprising:
   receiving, by a processor, an incoming instruction sequence, wherein the instruction sequence includes a branch instruction; and
   tracking, by the processor, both a delayed branch instruction and the branch instruction using the delayed branch compare record table in response to receipt of the branch instruction, wherein the delayed branch compare record table uses an identifier value to link between the delayed branch instruction and the branch instruction in the delayed branch compare record table,
   wherein the incoming instruction sequence is separate from the delayed branch compare record table.

2. The method of claim 1, further comprising:
   performing the delayed branch instruction and storing an outcome of the delayed branch instruction in a compare outcome field of an entry in the delayed branch compare record table corresponding to the identifier value of the delayed branch instruction and the branch instruction when the delayed branch instruction is performed a predefined time period before a fetching of the branch instruction.

3. The method of claim 2, further comprising:
   fetching the branch instruction for execution;
   checking the entry of the delayed branch compare record table that corresponds to the identifier value to determine whether the compare outcome field of the entry has been updated; and
   using the outcome stored in the compare outcome field of the entry for execution of the branch instruction in response to determining that the compare outcome field has been updated.

4. The method of claim 1, further comprising:
   checking an entry of the delayed branch compare record table that corresponds to the identifier value to determine whether a compare outcome field of the entry has been updated;
   checking a branch prediction table in response to determining that the compare outcome field has not been updated; and
   using a branch prediction outcome from the branch prediction table for execution of the branch instruction.

5. The method of claim 4, further comprising:
   comparing, upon the compare outcome field of the entry being updated, the branch prediction outcome from the branch prediction table with the compare outcome field of the entry; and
   triggering a branch flush, in response to determining that the branch prediction outcome from the branch prediction table is different from the compare outcome field of the entry, to flush all instructions in an execution pipeline after the branch instruction.

6. The method of claim 1, wherein the identifier value is based on a program counter value associated with the delayed branch instruction.

7. The method of claim 1, wherein the identifier value is based on a program counter value associated with the branch instruction.

8. A system for determining outcomes of branch instructions by using a delayed branch compare record table, the system comprising:
   a front-end unit to receive an incoming instruction sequence, wherein the instruction sequence includes a branch instruction; and
   a delayed branch compare record table to track both a delayed branch instruction and the branch instruction using the delayed branch compare record table in response to receipt of the branch instruction, wherein the delayed branch compare record table uses an identifier value to link between the delayed branch instruction and the branch instruction in the delayed branch compare record table,
   wherein the incoming instruction sequence is separate from the delayed branch compare record table.

9. The system of claim 8, further comprising:
   an execution unit to perform the delayed branch instruction and storing an outcome of the delayed branch instruction in a compare outcome field of an entry in the delayed branch compare record table corresponding to the identifier value of the delayed branch instruction and the branch instruction when the delayed branch instruction is performed a predefined time period before a fetching of the branch instruction.

10. The system of claim 9, further comprising:
    a fetch unit to fetch the branch instruction for execution, wherein the execution unit to check the entry of the delayed branch compare record table that corresponds to the identifier value to determine whether the compare outcome field of the entry has been updated and use the outcome stored in the compare outcome field of the entry for execution of the branch instruction in response to determining that the compare outcome field has been updated.

11. The system of claim 8, further comprising:
    an execution unit to:
    check an entry of the delayed branch compare record table that corresponds to the identifier value to determine whether a compare outcome field of the entry has been updated;
    check a branch prediction table in response to determining that the compare outcome field has not been updated; and use a branch prediction outcome from the branch prediction table for execution of the branch instruction.

12. The system of claim 11, further comprising:
a retirement unit to:
compare, upon the compare outcome field of the entry being updated, the branch prediction outcome from the branch prediction table with the compare outcome field of the entry; and
trigger a branch flush, in response to determining that the branch prediction outcome from the branch prediction table is different from the compare outcome field of the entry, to flush all instructions in an execution pipeline after the branch instruction.

13. The system of claim 8, wherein the identifier value is based on a program counter value associated with the delayed branch instruction.

14. The system of claim 8, wherein the identifier value is based on a program counter value associated with the branch instruction.

15. A non-transitory machine-readable medium containing instructions that, when performed by a processor, cause the performance of operations comprising:
receiving an incoming instruction sequence, wherein the instruction sequence includes a branch instruction; and
tracking both a delayed branch instruction and the branch instruction using the delayed branch compare record table in response to receipt of the branch instruction, wherein the delayed branch compare record table uses an identifier value to link between the delayed branch instruction and the branch instruction in the delayed branch compare record table,
wherein the incoming instruction sequence is separate from the delayed branch compare record table.

16. The non-transitory machine-readable medium of claim 15, wherein the operations further comprise:
performing the delayed branch instruction and storing an outcome of the delayed branch instruction in a compare outcome field of an entry in the delayed branch compare record table corresponding to the identifier value of the delayed branch instruction and the branch instruction.

17. The non-transitory machine-readable medium of claim 16, wherein the operations further comprise:
fetching the branch instruction for execution;
checking the entry of the delayed branch compare record table that corresponds to the identifier value to determine whether the compare outcome field of the entry has been updated; and
using the outcome stored in the compare outcome field of the entry for execution of the branch instruction in response to determining that the compare outcome field has been updated.

18. The non-transitory machine-readable medium of claim 15, wherein the operations further comprise:
checking an entry of the delayed branch compare record table that corresponds to the identifier value to determine whether a compare outcome field of the entry has been updated;
checking a branch prediction table in response to determining that the compare outcome field has not been updated; and
using a branch prediction outcome from the branch prediction table for execution of the branch instruction.

19. The non-transitory machine-readable medium of claim 18, wherein the operations further comprise:
comparing, upon the compare outcome field of the entry being updated, the branch prediction outcome from the branch prediction table with the compare outcome field of the entry; and
triggering a branch flush, in response to determining that the branch prediction outcome from the branch prediction table is different from the compare outcome field of the entry, to flush all instructions in an execution pipeline after the branch instruction.

20. The non-transitory machine-readable medium of claim 15, wherein the identifier value is based on one of a program counter value associated with the delayed branch instruction and a program counter value associated with the branch instruction.

* * * * *